(12) United States Patent
Onishi et al.

(10) Patent No.: US 8,587,894 B2
(45) Date of Patent: Nov. 19, 2013

(54) DISC DEVICE

(75) Inventors: Akihito Onishi, Tokyo (JP); Takaharu Eguchi, Tokyo (JP); Yoshifumi Awakura, Tokyo (JP); Tatsunori Fujiwara, Tokyo (JP); Akinori Tsukaguchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 434 days.

(21) Appl. No.: 12/995,713

(22) PCT Filed: Jul. 10, 2009

(86) PCT No.: PCT/JP2009/003243
§ 371 (c)(1),
(2), (4) Date: Dec. 2, 2010

(87) PCT Pub. No.: WO2010/026693
PCT Pub. Date: Mar. 11, 2010

(65) Prior Publication Data
US 2011/0080818 A1 Apr. 7, 2011

(30) Foreign Application Priority Data
Sep. 2, 2008 (JP) .................................. 2008-224791

(51) Int. Cl.
*G11B 7/00* (2006.01)
*G11B 17/04* (2006.01)
*F16H 21/16* (2006.01)

(52) U.S. Cl.
USPC .......................... 360/99.07; 720/664; 720/661

(58) Field of Classification Search
None
See application file for complete search history.

(56) References Cited

U.S. PATENT DOCUMENTS 5,119,357 A * 6/1992 Tsuruta et al. ................ 720/608
2004/0117808 A1 6/2004 Tuchiya

FOREIGN PATENT DOCUMENTS

| JP | 4-113056 A | 4/1992 |
| JP | 2002-288911 A | 10/2002 |
| JP | 2004-127336 A | 4/2004 |
| JP | 2005-259261 A | 9/2005 |
| JP | 2006-127615 A | 5/2006 |

* cited by examiner

*Primary Examiner* — Joseph Haley
*Assistant Examiner* — Carl Adams
(74) *Attorney, Agent, or Firm* — Birch, Stewart, Kolasch & Birch, LLP

(57) ABSTRACT

A disc device includes a first cam gear 13 having a cam groove 13d, and engaged with and released from one gear of a power transmission system, and a second cam gear 14 having a hole portion 14d corresponding to the cam groove 13d, laid on the first cam gear 13 and rotatably supported relative to the first cam gear 13, and engaged with and released from one gear of the power transmission system.

4 Claims, 6 Drawing Sheets

DISC DEVICE

FIELD OF THE INVENTION

The present invention relates to a disc device that carries out disc conveying and pickup feeding by using a single power source.

BACKGROUND OF THE INVENTION

This type of disc device needs to additionally include a power switching mechanism for driving disc conveying, mode switching, and pickup feeding by using a single motor. Conventionally, as a power switching mechanism for use in disconnection in the disc conveying, two types of methods, e.g., a method of adding a swinging mechanism to a specific gear and a method of forming a specific gear into an incomplete shape and disconnecting the gear with intermittent driving, as shown in patent reference 1, are known.

RELATED ART DOCUMENT

Patent Reference

Patent reference 1: JP, 4-113056, A

SUMMARY OF THE INVENTION

Because the conventional disc device is constructed as mentioned above, in a case in which a swinging mechanism is additionally included in a specific gear, it is necessary to establish synchronization of the gear engagement position. A problem is therefore that when the synchronization is lost, the conventional disc device may enter a mechanically locked state. A further problem is that in a case in which a specific gear is formed into an incomplete shape and is disconnected with intermittent driving, the conventional disc device may enter a mechanically locked state due to contact at the tips of gear teeth at the time of power connection.

The present invention is made in order to solve the above-mentioned problems, and it is therefore an object of the present invention to provide a disc device that, even when contact at the tips of teeth of a gear occurs at the time of operation connection, can release the gear to avoid mechanical locking without establishing the synchronization of the engagement position of the gear.

In accordance with the present invention, there is provided a disc device including: a rack gear extending in a movement direction of the above-mentioned pickup, and disposed integrally with the above-mentioned pickup; a first partially toothless gear having a cam groove, and engaged with and released from one gear of the above-mentioned power transmission system; a second partially toothless gear having a hole corresponding to the above-mentioned cam groove, laid on the above-mentioned first partially toothless gear and rotatably supported relative to the above-mentioned first partially toothless gear, and engaged with and released from one gear of the above-mentioned power transmission system; a rotary lever having an engagement part which comes into contact with a locking member on the above-mentioned rack gear to press the above-mentioned rack gear toward the movement direction of the above-mentioned pickup at an end thereof, and a pin penetrating through the above-mentioned hole and acting on the above-mentioned cam groove at another end thereof; a trigger member that operates at a time of completion of insertion of the disc so as to make the above-mentioned first partially toothless gear rotate to be engaged with one gear of the above-mentioned power transmission system; an operation member that operates in response to a rotational force of the above-mentioned first partially toothless gear so as to disconnect the above-mentioned power transmission system from a disc conveying roller; and a first pushing member disposed between the above-mentioned rotary lever and the above-mentioned rack gear, for moving the above-mentioned rack gear by using the engagement part of the above-mentioned rotary lever which is rotated by rotation of the above-mentioned first partially toothless gear so as to engage the above-mentioned rack gear with another gear of the above-mentioned power transmission system, and releasing the engagement of the above-mentioned second partially toothless gear with the one gear of the above-mentioned power transmission system by using the above-mentioned pin.

Because the disc device in accordance with the present invention is constructed in such a way as to include the first partially toothless gear having the cam groove, and engaged with and released from one gear of the power transmission system and the second partially toothless gear having the hole corresponding to the cam groove, laid on the above-mentioned first partially toothless gear and rotatably supported relative to the above-mentioned first partially toothless gear, and engaged with and released from one gear of the power transmission system, the second partially toothless gear rotates relative to the first partially toothless gear even if contact at the tips of gear teeth occurs in the second partially toothless gear when the second partially toothless gear is engaged with one gear of the power transmission system. Therefore, the possibility of causing mechanical locking in the disc device can be reduced greatly, and driving force switching which can avoid the occurrence of mechanical locking can be implemented within the space-saving disc device.

EMBODIMENT OF THE INVENTION

Hereafter, in order to explain this invention in greater detail, the preferred embodiment of the present invention will be described with reference to the accompanying drawings.

Embodiment 1

Figure 1:
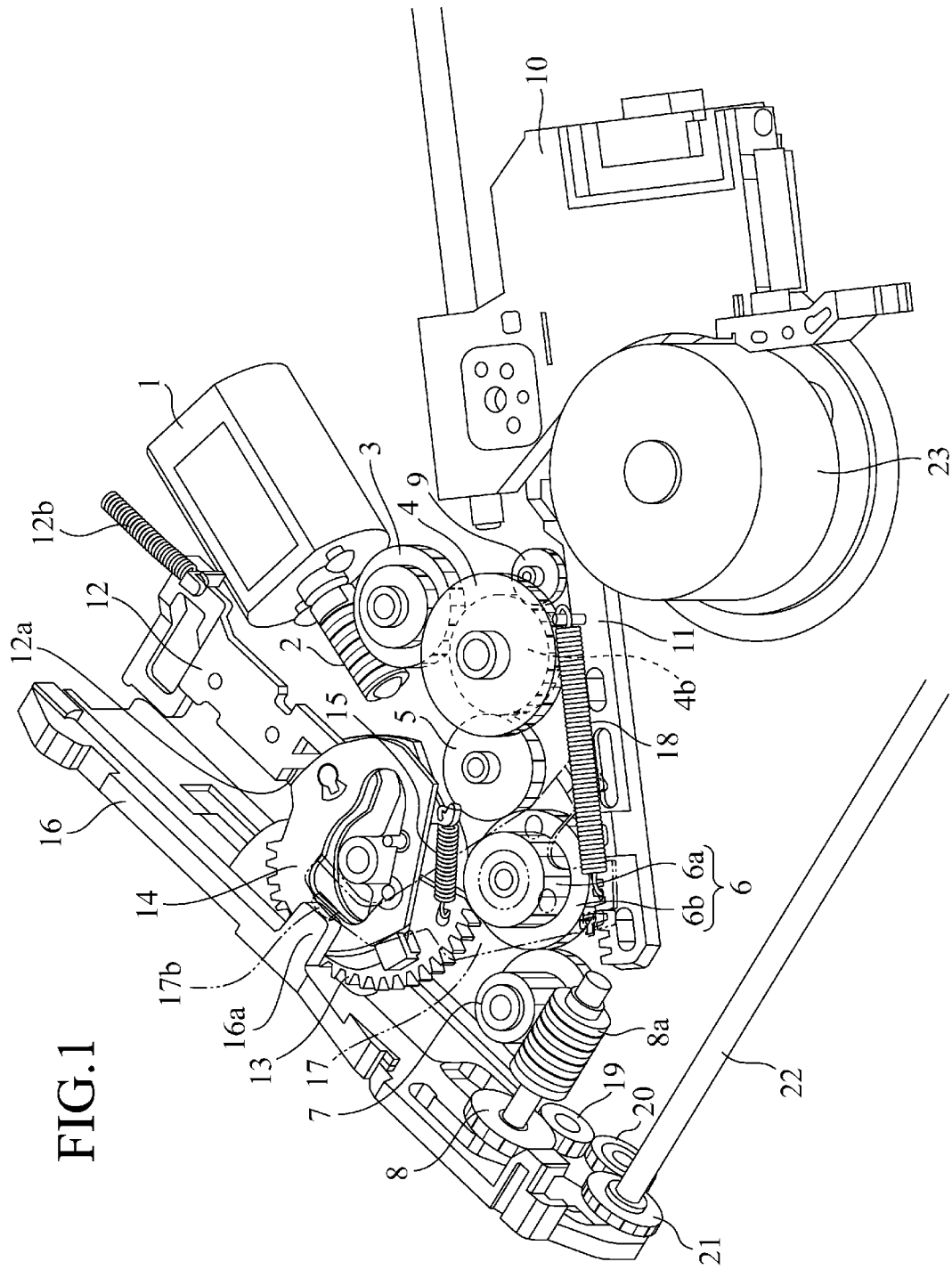
FIG. 1 is a perspective view showing the structure of a disc device in accordance with Embodiment 1.
Figure 2:
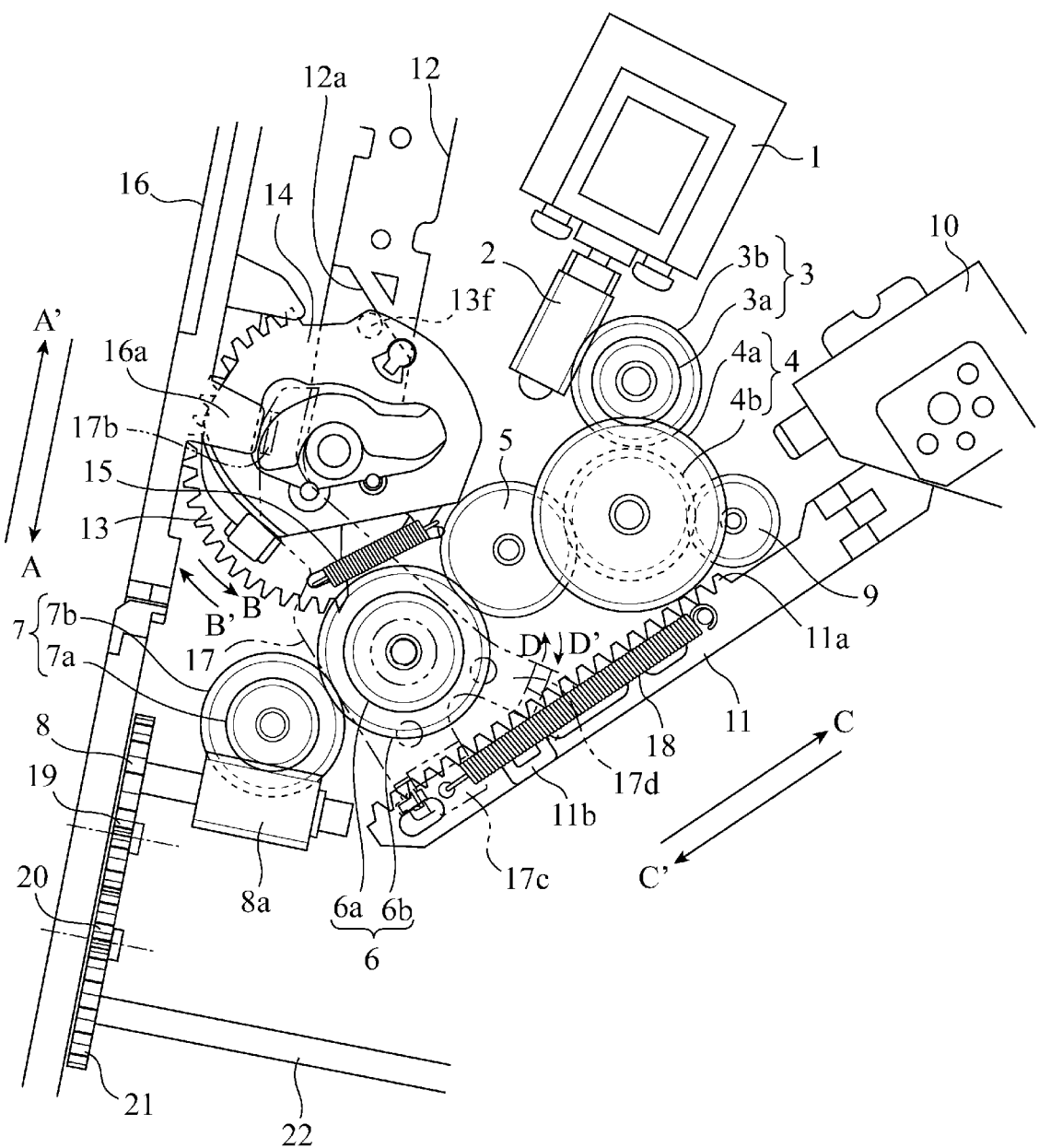
FIG. 2 is a plane view showing the structure of the disc device in accordance with Embodiment 1.

FIG. 1 is a perspective view showing a power switching unit of a disc device in accordance with Embodiment 1, and FIG. 2 is a plane view of the power switching unit. This disc device will be explained hereafter, focusing on disc conveying which is an initial state, mode switching at the time of making a transition from the disc conveying state to a pickup feeding state, and transmitting power in the pickup feeding.

This disc device is provided with main components including a motor 1 which is a driving source, a worm gear 2 attached to the rotatable shaft of the motor 1, a plurality of gears 3 to 9 and 19 to 21 for propagating the rotation of the worm gear 2, a pickup 10 for performing a process of reading an information signal on a disc, a rack gear 11 disposed to extend in a movement direction of the pickup 10, a trigger member 12 that operates when detecting an insertion of a disc into the disc device to perform an operation of making a transition to the mode switching of the disc device, a first cam gear (a first partially toothless gear) 13, a second cam gear (a second partially toothless gear) 14, and a rotary lever 17 which are disposed for carrying out the mode switching, a sliding member (an operation member) 16 that moves in synchronization with the mode switching operation, and a turntable 23 for rotating the disc.

Next, the plurality of gears 3 to 9 for propagating the power of the motor 1 will be explained with reference to FIG. 2. The gear 3 is comprised of a small-diameter gear 3a disposed on an upper side thereof, and a large-diameter gear 3b disposed on a lower side thereof, and the large-diameter gear 3b is engaged with the worm gear 2 to rotate. The gear 4 is comprised of a large-diameter gear 4a disposed on an upper side thereof, and a small-diameter gear 4b disposed on a lower side thereof, and the large-diameter gear 4a is engaged with the small-diameter gear 3a to rotate. The gear 5 is engaged with the small-diameter gear 4b to rotate.

The gear 6 is comprised of a small-diameter gear 6a disposed on an upper side thereof, and a large-diameter gear 6b disposed on a lower side thereof, and the large-diameter gear 6b is engaged with the gear 5 to rotate. The gear 7 is comprised of a small-diameter gear 7a disposed on an upper side thereof, and a large-diameter gear 7b disposed on a lower side thereof, and the large-diameter gear 7b is engaged with the large-diameter gear 6b to rotate. The gear 8 has a crossed helical gear 8a at an end of the rotatable shaft thereof, and this crossed helical gear 8a is engaged with the small-diameter gear 7a to rotate. The pinion gear 9 is engaged with the small-diameter gear 4b to rotate.

At the time of disc conveying, the rotation of the gear 8 is propagated to the shaft 22 via the gear 19, the gear 20, and the gear 21, and the disc is conveyed by a conveyance roller (not shown) disposed on this shaft 22. Furthermore, at this time of disc conveying, because the pinion gear 9 is not engaged with a gear part 11a of the rack gear 11, the pinion gear 9 runs at idle. In contrast, at the time of pickup feeding, the engagement between the gear 20 and the gear 21 is released and the gear 20 runs at idle, and the pinion gear 9 is engaged with the gear part 11a of the rack gear 11 and the rack gear 11 moves.

Next, the first cam gear 13 and the second cam gear 14 which are structural components for carrying out the mode switching will be explained with reference to FIGS. 3 and 4.

Figure 3:
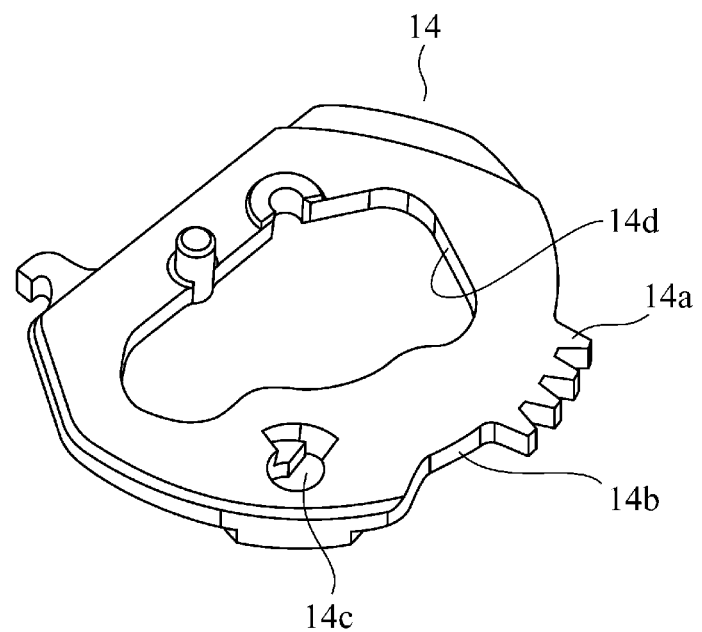
FIG. 3 is an exploded perspective view showing the structure of a cam gear of the disc device in accordance with Embodiment 1.
Figure 3:
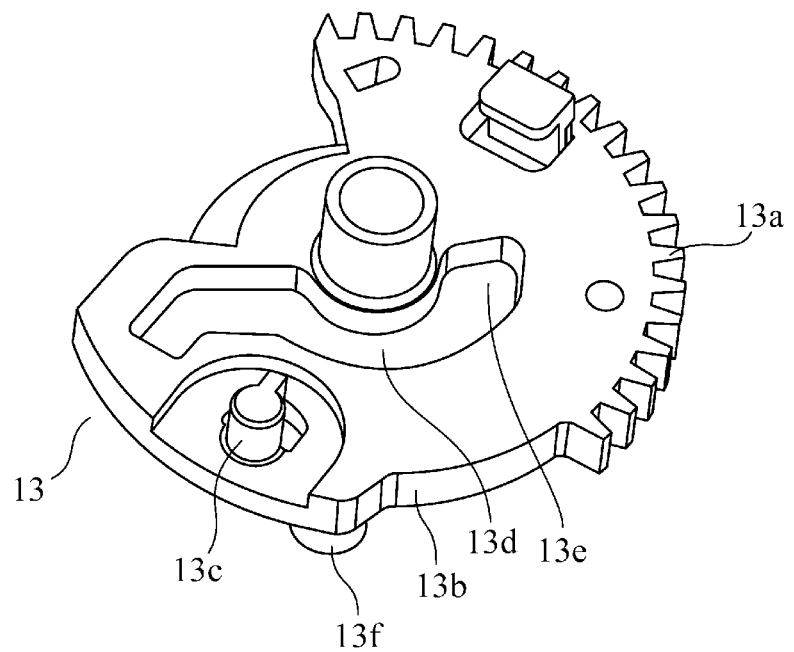
Figure 4:
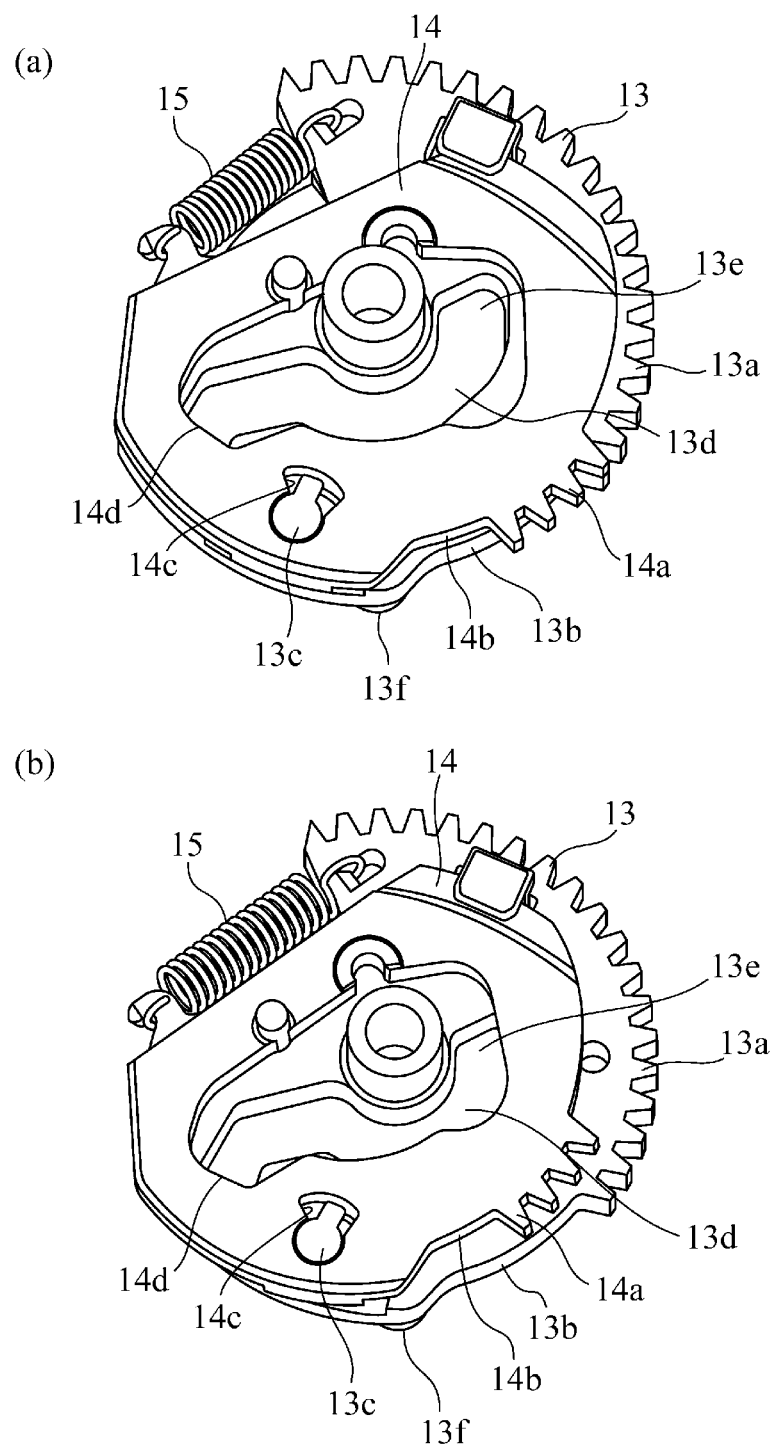
FIG. 4 is a perspective view showing a state in which the cam gear is assembled in the disc device in accordance with Embodiment 1.

FIG. 3 is an exploded perspective view showing the structure of the first and second cam gears of the disc device in accordance with Embodiment 1 of the present invention. FIG. 4 is a perspective view showing a state in which those cam gears are assembled into an integral piece, FIG. 4(a) shows a state at the time of disc conveying, and FIG. 4(b) shows a state at the time of pickup feeding.

The first cam gear 13 has a gear part 13a and a toothless part 13b in a peripheral portion thereof, and has a protruding portion 13c in a vicinity of the peripheral portion. Furthermore, a cam groove 13d which is a recessed portion which is formed of a combination of a simple arc-shaped recessed part and line-shaped recessed parts is disposed in a central portion of the first cam gear 13. The cam groove 13d has a release region 13e formed in an end portion thereof, the release region having a groove width which is wider than those of the other groove parts, and this release region 13e is formed in such a way that its groove width is slightly wider than the diameter of a pin 17a of the rotary lever 17 which will be mentioned below. In addition, a pin 13f that is brought into contact with the trigger member 12 is formed on a rear surface of the first cam gear 13.

The second cam gear 14 has a gear part 14a and a toothless part 14b in a peripheral portion thereof, and has a fitting hole 14c into which the protruding portion 13c of the first cam gear 13 can be fitted in a vicinity of the peripheral portion. Furthermore, a hole portion (a hole) 14d corresponding to the cam groove 13d is formed in a central portion of the second cam gear 14. By inserting the protruding portion 13c into the fitting hole 14c, and laying a spring (a second pushing member) 15 between the first cam gear 13 and the second cam gear 14 in a tensioned state, the first cam gear 13 and the second cam gear 14 are assembled into an integral piece. At the time of assembling the first and second cam gears into an integral piece, these cam gears are arranged in such a way that the last tooth of the gear part 13a and the first tooth of the gear part 14a lie on top of each other, and the gear parts 13a and 14a are running in series. The spring 15 causes the first cam gear 13 and the second cam gear 14 to be pressed against each other, so that the two cam gears can rotate as an integral piece.

In FIG. 4(a) showing the time of disc conveying, the last tooth of the gear part 13a and the first tooth of the gear part 14a lie on top of each other, and the gear parts 13a and 14a are continuously positioned on the same circumference. In contrast, in FIG. 4(b) showing the time of pickup feeding, the second cam gear 14 rotates about the protruding portion 13c fitted into the fitting hole 14c in response to the rotational force of the rotary lever 17 which is caused by the tension of the spring 18 and the gear part 14a of the second cam gear 14 moves more inwardly than the outer circumference of the toothless part 13b of the first cam gear 13, so that the engagement with the gear 6 (not shown) is released. On the other hand, because the force for engaging the second cam gear 14 with the gear 6 is acquired from the spring 15, even when contact at the tips of gear teeth occurs in the gear part 14a at the time of engagement between the second cam gear 14 and the gear 6, the second cam gear 14 can be flipped (released) in response to the pushing force of the spring 15, and therefore the second cam gear 14 can be prevented from entering a mechanically locked state.

Figure 5:
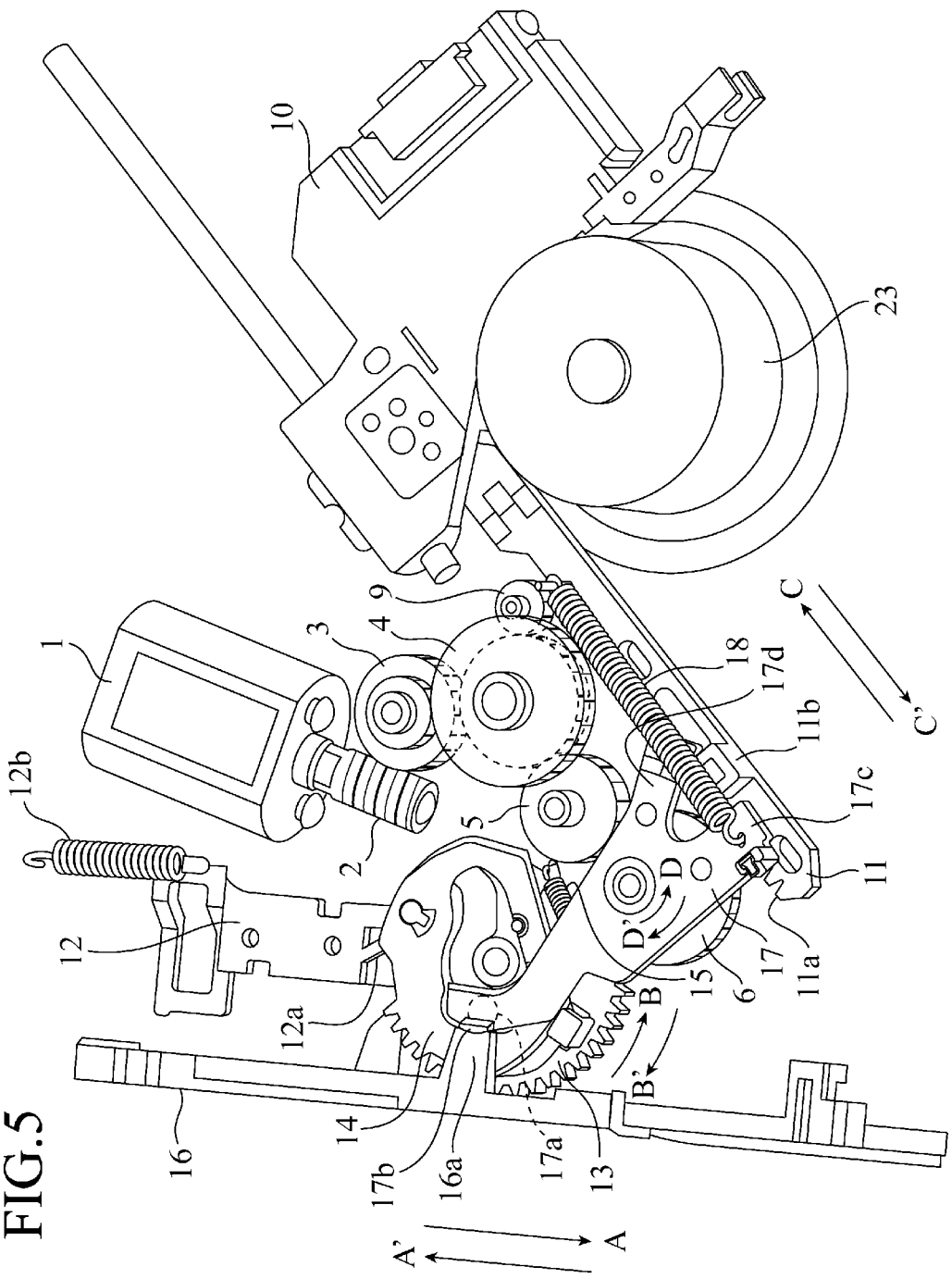
FIG. 5 is a perspective view showing a relationship among components of a power switching mechanism of the disc device in accordance with Embodiment 1.
Figure 6:
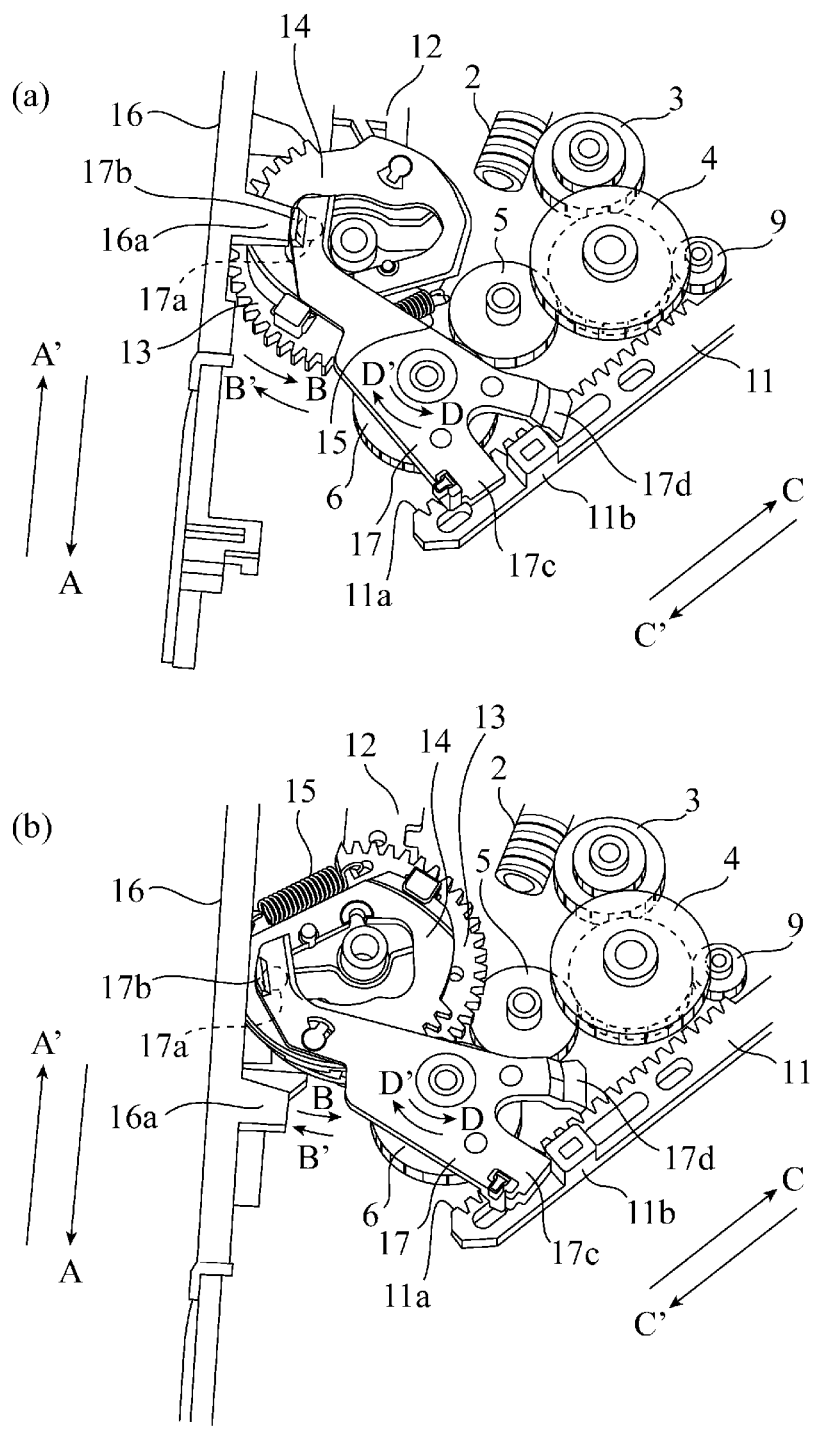
FIG. 6 is a perspective view showing a relationship among components of the power switching mechanism of the disc device in accordance with Embodiment 1.

In addition, the rotary lever 17, the trigger member 12, and the sliding member 16 which are structural components for carrying out the mode switching will be explained with reference to FIGS. 1, 2, 5, and 6. FIGS. 5 and 6 are perspective views showing a relationship among components of the power switching mechanism of the disc device in accordance with Embodiment 1.

The rotary lever 17 has the pin 17a penetrating through the hole portion 14d and acting on the cam groove 13d at a tip part thereof, and a protruding portion 16a protruding from the sliding member 16 is brought into contact with a rising portion 17b disposed in the vicinity of this pin 17a in the disc conveying state (the initial state). Because the protruding portion 16a is into contact with the rising portion to support the rotary lever 17, when the first cam gear 13 and the second cam gear 14 start rotating, only the cam groove 13d can be moved with the pin 17a being held in the initial state and the pin 17a can be positioned at the center of the release region 13e. As a result, the pin 17a can be prevented from coming into contact with the wall surface of the cam groove 13d, and the frictional force between them can be reduced to zero. In other words, the rotational load imposed on the first cam gear 13 can be reduced.

Furthermore, bifurcated legs (an engagement part) 17c and 17d are formed at the other end of the rotary lever 17. As shown in FIG. 6, the legs 17c and 17d are arranged in such a way as to sandwich a locking portion (a locking member) 11b formed in the rack gear 11 from both sides of the locking portion, and the rotary lever 17 is always pushed toward a direction of an arrow D by the spring (a first pushing member) 18 extended between the leg 17c and the rack gear 11. The center of rotation of the rotary lever 17 exists on the rotation center axis of the gear 6, and the rotary lever 17 rotates about this center of rotation in directions of arrows D and D' in response to the pushing force of the spring 18 and a movement of the pin 17a in the cam groove 13d.

The trigger member 12 moves in a direction of an arrow A at the time of the completion of insertion of a disc into the disc device to rotate the first cam gear 13 in a direction of an arrow B via the pin 13f in contact with a cam face 12a and engage the first cam gear 13 with the gear 6. The sliding member 16 is engaged with the first cam gear 13 and the second cam gear 14 at the time of mode switching, and moves in directions of arrows A and A'. The sliding member 16 has the protruding portion 16a which comes into contact with the rising portion 17b of the rotary lever 17. Furthermore, the sliding member 16 is attached to a base member (not shown) to which the gears 3 to 9 are attached, together with the gear 8, the gear 19, the gear 20, the gear 21, and the shaft 22.

Next, the operation of the disc device will be explained with reference to FIGS. 1 and 6. FIG. 6(a) shows a relationship among the components of the power switching mechanism at the time of disc conveying, and FIG. 6(b) shows a relationship among the components of the power switching mechanism at the time of mode switching and at the time of pickup feeding.

In all the operating states, the driving force of the motor 1 is propagated to the gear 6. In this state, at the time of disc conveying shown in FIG. 6(a), the driving force is propagated to the shaft 22 via the gear 7 engaged with the gear 6, and the other gears 8, 19, 20, and 21. The shaft 22 rotates in response to this driving force, and the conveyance roller (not shown) disposed on this shaft 22 then inserts the disc into the disc device. At this time of disc conveying, the gear part 13a of the first cam gear 13 is not engaged with the gear 6, and the pinion gear 9 is not engaged with the gear part 11a of the rack gear 11, either. Furthermore, the protruding portion 16a of the sliding member 16 is in contact with the rising portion 17b of the rotary lever 17. Therefore, the pin 17a is not in contact with the wall surface of the cam groove 13d.

After the insertion of the disc is completed, the trigger member 12 starts moving in the direction of the arrow A. As the trigger member 12 moves in the direction of the arrow A, the pin 13f of the first cam gear 13 moves along the cam face 12a with the pin being pushed against the cam face, and the whole first cam gear 13 starts rotating in the direction of the arrow B. The trigger member 12 pushes and rotates the first cam gear 13 up to a position at which the gear part 13a starts engagement with the gear 6. At this time, the second cam gear 14 also rotates in the direction of the arrow B integrally with the first cam gear.

Although the sliding member 16 starts sliding in the direction of the arrow A as the first cam gear 13 and the second cam gear 14 rotate, the contact of the protruding portion 16a with the rising portion 17b of the rotary lever 17 is maintained during the rotation of the first cam gear 13 which is caused by the trigger member 12. As a result, while the first cam gear 13 is rotated up to the position at which the gear part 13a of the first cam gear 13 starts engagement with the gear 6, the rotary lever 17 is supported by the sliding member 16 and the rotation of the rotary lever in the direction of the arrow D is prevented.

In case that the rotary lever 17 is not supported by the sliding member 16, like in a conventional case, a large rotational load is imposed on the first cam gear 13 due to the frictional force resulting from the contact of the pin 17a with the wall of the cam groove 13d. Therefore, it becomes difficult to make the first cam gear 13 operate stably with the small force caused by the trigger member 12.

In contrast, because in the disc device in accordance with this Embodiment 1, the release region 13e is disposed in the cam groove 13d, and the protruding portion 16a of the sliding member 16 is brought into contact with the rising portion 17b of the rotary lever 17 in such a way that the rotary lever 17 is supported by the sliding member 16, the pin 17a can be held at the center portion of the release region 13e, and the pin 17a can be prevented from coming into contact with the wall of the cam groove 13d. As a result, the occurrence of a frictional force between the pin and the cam groove can be prevented and the rotational load imposed on the first cam gear 13 can be reduced.

On the other hand, the gear 21 moves as the sliding member 16 moves in the direction of the arrow A to release the engagement between the gear 20 and the gear 21 and stop the propagation of the driving force of the motor 1 to the shaft 22.

Next, the operation of the disc device at the time of mode switching (at the time of rotation of the first cam gear 13) and at the time of pickup feeding will be explained with reference to FIG. 6(b).

When the first cam gear 13 is pushed and rotated by the trigger member 12 and the tip of the gear part 13a starts engagement with the gear 6, the first cam gear 13 acquires the driving force of the motor 1 from this gear 6 to continue rotating. When the first cam gear 13 thus rotates up to the position at which the gear part 13a and the gear 6 are engaged with each other, the sliding member 16 moves in the direction of the arrow A and the contact of the protruding portion 16a with the rising portion 17b of the rotary lever 17 is then released.

At the same time when this contact is released, the rotary lever 17 starts rotating in the direction of the arrow D in response to the pushing force of the spring 18, and the contact with the pin 17a is transferred from the protruding portion 16a of the sliding member 16 to the cam groove 13d of the first cam gear 13. At this time when the contact with the pin is transferred, the region of the cam groove 13d having an original groove width which is narrower than the wide groove width of the release region 13e can smoothly accept the transfer of the pin 17a thereto. Furthermore, because the rotational driving force of the first cam gear 13 engaged with the gear 6 becomes large, even if the transfer of the rotary lever 17 imposes a rotational load on the cam groove 13d, the influence of the rotational load on the rotational driving force is small. After the transfer of the rotary lever 17, the first cam gear 13 and the second cam gear 14 further rotate in the direction of the arrow B, and the rotary lever 17 transferred to the first cam gear 13 is pushed toward the direction of the arrow D by the tension of the spring 18 and the pin 17a therefore moves in the cam groove 13d.

At the time of pickup feeding, when the first cam gear 13 and the second cam gear 14 rotate about a half turn after starting engagement with the gear 6, the toothless part 13b of the first cam gear 13 moves to a position at which the toothless part faces the gear 6 and the engagement between the first cam gear 13 and the gear 6 is released. At this time, the gear part 14a of the second cam gear 14 moves to a position at which the gear part faces the gear 6 and can be engaged with the gear, though the gear part 14a moves more inwardly than the toothless part 13b around the protruding unit 13c serving as an axis in response to the rotational force in the direction of the arrow D of the rotary lever 17, which is caused by the pushing force of the spring 18, and the engagement of the gear part with the gear 6 is released. After the engagement of the gear part with the gear 6 is released, the propagation of the driving force of the motor 1 to the first cam gear 13 and the second cam gear 14 is stopped, and the rotation of them in the direction of the arrow B is stopped.

When contact at the tips of gear teeth occurs in the gear part 14a at the time of engagement between the second cam gear 14 and the gear 6, a release of the second cam gear 14 using the pushing force of the spring 15 can prevent the second cam gear from entering a mechanically locked state.

On the other hand, when rotating in the direction of the arrow D, the rotary lever 17 pushes the locking portion 11b of the rack gear 11 in the direction of the arrow C by using the leg 17c. When this pushing in the direction of the arrow C moves the above-mentioned first and second cam gears 13 and 14 to a position at which the engagement of them with the gear 6 is released, the gear part 11a of the rack gear 11 moves to a position at which the gear part is engaged with the pinion gear 9. As a result, the driving force of the motor 1 is propagated to the rack gear 11 via the pinion gear 9, and the pickup 10 moves in the direction of the arrow C, together with the rack gear 11, to read the disc.

Next, an operation, which is reverse to the above-mentioned operation, in a case in which the motor 1 rotates in the reverse direction will be explained. The rack gear 11 moves in the direction of the arrow C' in response to the driving force of the motor 1 which is propagated thereto via the pinion gear 9, and the locking portion 11b pushes the leg 17c of the rotary lever 17 toward the direction of the arrow C'. While the rotary lever 17 starts rotating in the direction of the arrow D' and the pin 17a moves in the cam groove 13d, the gear part 14a of the second cam gear 14 moves to a position at which the gear part faces the outer circumference of the gear part 13a of the first cam gear 13 in response to the pushing force of the spring 15 and is engaged with the gear 6, and then starts rotating in the direction of the arrow B'. After that, the first cam gear 13 is engaged with the gear 6, too, and rotates in the direction of the arrow B'.

While the sliding member 16 slides in the direction of the arrow A' as the first cam gear 13 and the second cam gear 14 rotate in the direction of the arrow B', the rising portion 17b of the rotary lever 17 in which the pin 17a has been moving in the cam groove 13d of the first cam gear 13 comes into contact with the protruding portion 16a of the sliding member 16 and is then supported by the protruding portion. While the engagement of the first cam gear 13 with the gear 6 is released by this rotation, the trigger member 12 moves in the direction of the arrow A' in response to the tension of the spring 12b attached to the trigger member 12. After the rotation of this first cam gear 13 is completed, the sliding of the sliding member 16 in the direction of the arrow A' is also ended, the gear 21 is engaged with the gear 20, and the driving force of the motor 1 is propagated to the shaft 22 via the gear 21. As a result, the conveyance roller disposed on the shaft 22 rotates in the reverse direction, and an operation of ejecting the disc is carried out.

As mentioned above, because the disc device in accordance with this Embodiment 1 is constructed in such a way as to use the switching mechanism in which the first cam gear 13 and the second cam gear 14 are arranged in such a way as to lie on top of each other, the components of the disc device can be arranged efficiently in a smaller space in the disc device.

Furthermore, because the disc device in accordance with this Embodiment 1 is constructed in such a way as to acquire the force at the time of engaging the second cam gear 14 with the gear 6 from the spring 15, the second cam gear 14 can be released even when contact at the tips of gear teeth occurs in the second cam gear, and therefore the possibility of causing mechanical locking in the second cam gear can be reduced greatly. In addition, the distance at which the engagement between the gear 6 and the first and second cam gears 13 and 14 is disconnected can be ensured greatly, and therefore occurrence of unusual sound at the time of operation can be suppressed.

Furthermore, because the disc device in accordance with this Embodiment 1 is constructed in such a way that the rotary lever 17 moves in response to the pushing force of the spring 18, the shape of the cam groove 13d in which the pin 17a of the rotary lever 17 moves can be simplified. More specifically, because the cam groove 13d of the first cam gear 13 is formed of only a simple arc-shaped recessed part and line-shaped recessed parts, the dimensional control of the first cam gear 13 and so on can be facilitated.

In the structure in accordance with above-mentioned Embodiment 1, the leg 17d of the rotary lever 17 has the function of preventing a mechanical mode displacement from occurring in the disc device. In a state in which no disc is inserted into the disc device, the rack gear 11 is not connected to the pinion gear 9 and hence the driving force of the motor 1 is not propagated to the rack gear. However, when a shock is applied to the disc device due to a fall of the disc device, vibrations, or the like in this state, there is a possibility that the rack gear 11 moves and is connected to the pinion gear 9, the disc device makes a transition to the pickup feeding operation, and this causes occurrence of a mechanical mode displacement. Although a structure of disposing a locking means in order to prevent this occurrence of a mechanical mode displacement has been known conventionally, the disc device in accordance with this Embodiment 1 is constructed in such a way that the leg 17d functions as such a locking means.

More specifically, in the state in which the rack gear 11 is not engaged with the pinion gear 9, as shown in FIG. 6(a), the leg 17d is brought into contact with the locking portion 11b so as to prevent the rack gear 11 from further moving in the direction of the arrow C. In contrast, in the state in which the insertion of a disc is completed and the rack gear 11 is engaged with the pinion gear 9, as shown in FIG. 6(b), the leg 17d is retreated from the path of the rack gear 11 in such a way as not to obstruct the movement of the rack gear 11. Because the disc device can thus prevent the occurrence of a mechanical mode displacement without disposing any new locking means, the cost of the disc device can be reduced while the structure of the disc device can be simplified.

INDUSTRIAL APPLICABILITY

In the disc device in accordance with the present invention, the second partially toothless gear rotates relative to the first partially toothless gear even if contact at the tips of gear teeth occurs in the second partially toothless gear when the second partially toothless gear is engaged with one gear of the power transmission system. As a result, the possibility of causing mechanical locking in the disc device can be reduced greatly, and driving force switching which can avoid the occurrence of mechanical locking can be implemented within the space-saving disc device. Therefore, the disc device in accordance with the present invention is suitable for use as a disc device that carries out disc conveying and pickup feeding by using a single source of power, and so on.

The invention claimed is:

1. A disc device that changes a power transmission system using a single driving source so as to carry out either of conveying of a disc and feeding of a pickup, said disc device comprising:
   a rack gear extending in a movement direction of said pickup, and disposed integrally with said pickup;
   a first partially toothless gear having a cam groove, and engaged with and released from one gear of said power transmission system;
   a second partially toothless gear having a hole corresponding to said cam groove, laid on said first partially toothless gear and rotatably supported relative to said first partially toothless gear, and engaged with and released from one gear of said power transmission system;
   a rotary lever having an engagement part which comes into contact with a locking member on said rack gear to press said rack gear toward the movement direction of said pickup at an end thereof, and a pin penetrating through said hole and acting on said cam groove at another end thereof;
   a trigger member that operates at a time of completion of insertion of the disc so as to make said first partially toothless gear rotate to be engaged with one gear of said power transmission system;
   an operation member that operates in response to a rotational force of said first partially toothless gear so as to disconnect said power transmission system from a disc conveying roller; and
   a first pushing member disposed between said rotary lever and said rack gear, for moving said rack gear by using the engagement part of said rotary lever which is rotated by rotation of said first partially toothless gear so as to engage said rack gear with another gear of said power transmission system, and releasing the engagement of said second partially toothless gear with the one gear of said power transmission system by using said pin.

2. The disc device according to claim 1, wherein a second pushing member is disposed between the first partially toothless gear and the second partially toothless gear.

3. The disc device according to claim 1, wherein the engagement part of the rotary lever is bifurcated in such a way as to sandwich the locking member on the rack gear from both sides of the locking member in the movement direction.

4. The disc device according to claim 1, wherein said second partially toothless gear is movable separate from said first partially toothless gear from a first position in which teeth of said second partially toothless gear are aligned with teeth of said first partially toothless gear, to a second position in which said teeth or said second partially toothless gear are positioned behind said teeth of said first partially toothless gear.

* * * * *